Nov. 19, 1963 F. E. LEHMANN 3,111,612

CAPACITOR

Filed Oct. 29, 1959

INVENTOR.
Fred E. Lehmann
BY
Ralph Hammar
attorney

United States Patent Office 3,111,612

Patented Nov. 19, 1963

3,111,612

CAPACITOR

Fred E. Lehmann, Erie, Pa., assignor to Erie Resistor Corporation, Erie, Pa., a corporation of Pennsylvania Filed Oct. 29, 1959, Ser. No. 849,631
1 Claim. (Cl. 317—242)

This invention is a capacitor adapted to automatic feeding and insertion in printed wiring boards. The capacitor is embedded in a thin, flat case of insulating material with one end of the case round and the opposite end square. The leads project from the square end of the case which serves as a stop positioning the caapcitor when mounted on a printed wiring board. The round end of the case facilitates proper orientation in feeding to insertion equipment.

Figure 1:
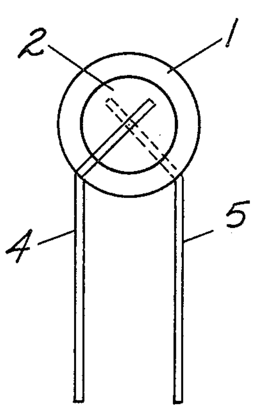
Figure 2:
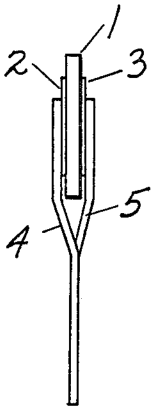
Figure 3:
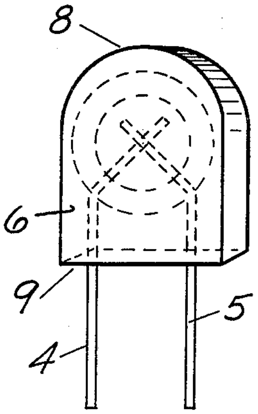
Figure 4:
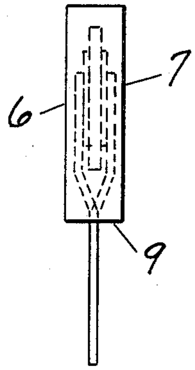
Figure 5:
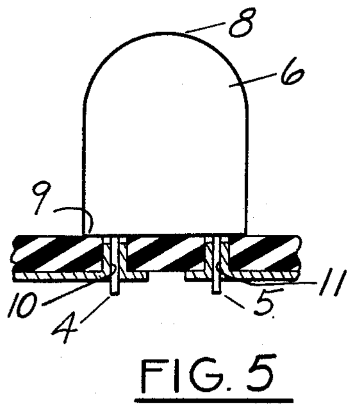

In the drawing, FIG. 1 is a front view of a disc capacitor, FIG. 2 is an edge view of FIG. 1, FIG. 3 is a perspective of the disc capacitor embedded in a molded case, FIG. 4 is an edge view of FIG. 3, and FIG. 5 is a fragmentary view of the capacitor mounted on a printed wiring board.

The capacitor has a disc 1 of dielectric material having on opposite faces electrodes 2, 3, respectively connected to one end of leads 4, 5. The leads have free ends extending away from the dielectric parallel to each other and substantially in the plane of the disc. There may be some slight bending of the leads adjacent the disc as illustrated in FIG. 2, but the bending will be less than illustrated in FIG. 2 because the thickness of the disc and the thickness of the electrodes has been exaggerated.

In order to adapt the capacitor of FIGS. 1 and 2 to automatic insertion equipment, the capacitor is embedded in a thin, flat case of molded insulating material having flat sides 6, 7 parallel to each other and having one end 8 of the case convex and the opposite end 9 square. The convex end 8 of the case is adapted to automatic feeding equipment for feeding the capacitors in proper orientation. The convex end is easily sensed by the feeding equipment to properly orient the capacitors. The flat sides of the case permit the capacitors to be stacked. The square end 9 of the case serves as a stop for locating the capacitor when the leads 4, 5 are inserted through holes 10, 11 in a printed wiring board as shown in FIG. 5. The projecting ends of the leads are normal to the square end and during the molding operation are easily located in a common plane between and parallel to the sides of the case and on a uniform spacing from each other and from the edges of the case so that the leads are accurately positioned for insertion in printed wiring boards.

What is claimed as new is:

A capacitor adapted to automatic insertion in a printed wiring board comprising a thin flat case of insulating material, said case being of substantially uniform thickness and having flat sides parallel to each other and one end convex and the opposite end square, and a capacitor embedded in the case having leads with projecting ends extending out through the square end of the case, said projecting ends of the leads being parallel and spaced from each other in a plane between and parallel to the sides of the case and being normal to said square end which serves as a stop to locate the capacitor when the leads are inserted through holes in a printed wiring board.

References Cited in the file of this patent

UNITED STATES PATENTS

| | | |
|---|---|---|
| 2,422,393 | Bryant | June 17, 1947 |
| 2,605,955 | Herrick | Aug. 12, 1952 |
| 2,796,498 | Dailey et al. | June 18, 1957 |
| 2,877,389 | Wiener | Mar. 10, 1959 |